(12) United States Patent
Noda et al.

(10) Patent No.: US 6,372,355 B1
(45) Date of Patent: Apr. 16, 2002

(54) ULTRAVIOLET ABSORPTIVE LAMINATED RESINOUS ARTICLE

(75) Inventors: Nobuhisa Noda, Hashima; Toshifumi Nishida, Suita; Takahiro Aoyama, Hyogo, all of (JP)

(73) Assignee: Nippon Shokubai Co., Ltd., Osaka (JP)

(*) Notice: Subject to any disclaimer, the term of this patent is extended or adjusted under 35 U.S.C. 154(b) by 0 days.

(21) Appl. No.: 09/587,389

(22) Filed: Jun. 5, 2000

Related U.S. Application Data

(63) Continuation of application No. PCT/JP99/05437, filed on Oct. 4, 1999.

(30) Foreign Application Priority Data

Oct. 5, 1998 (JP) .................................. 10-282991

(51) Int. Cl.$^7$ .......................... B32B 27/30; C08F 26/06; C08L 39/04
(52) U.S. Cl. ................ 428/447; 428/448; 526/259; 526/261; 526/279; 526/328
(58) Field of Search ................ 428/447, 448; 526/261, 259, 279, 328

(56) References Cited

U.S. PATENT DOCUMENTS

| | | | | |
|---|---|---|---|---|
| 4,353,959 A | | 10/1982 | Olson et al. | 428/331 |
| 4,533,595 A | * | 8/1985 | Olson et al. | 428/336 |
| 5,191,045 A | | 3/1993 | Funaki et al. | 526/259 |
| 5,198,498 A | | 3/1993 | Valet et al. | 525/125 |
| 5,250,359 A | | 10/1993 | Funaki et al. | 428/447 |
| 5,356,995 A | | 10/1994 | Valet et al. | 525/100 |
| 5,789,476 A | * | 8/1998 | Iryo et al. | 524/430 |

FOREIGN PATENT DOCUMENTS

| | | | |
|---|---|---|---|
| JP | 56-92059 | | 7/1981 |
| JP | 58-179237 | | 10/1983 |
| JP | 4-106161 | | 4/1992 |
| JP | 4-120181 | | 4/1992 |
| JP | 5-170995 | | 7/1993 |
| JP | 9-3133 | | 1/1997 |
| JP | 9-3135 | | 1/1997 |
| JP | 09003135 | * | 1/1997 |
| JP | 09003394 | * | 1/1997 |
| JP | 9-188847 | | 7/1997 |
| JP | 9-221608 | | 8/1997 |
| JP | 10-45854 | | 2/1998 |
| JP | 10-138437 | | 5/1998 |
| JP | 10-182978 | | 7/1998 |
| JP | 10-219140 | | 8/1998 |
| JP | 10254712 | * | 10/1998 |
| JP | 10-330409 | | 12/1998 |
| JP | 11138729 | * | 5/1999 |
| JP | 11-347489 | | 12/1999 |
| WO | 9834991 | * | 8/1998 |

* cited by examiner

Primary Examiner—Fred J. Parker
Assistant Examiner—Elena Tsoy
(74) Attorney, Agent, or Firm—Wenderoth, Lind & Ponack, LLP

(57) ABSTRACT

To provide a laminated resinous article having an improved weatherability without inviting ultraviolet-induced coloring or deterioration in interlayer adhesion and in surface hardness, and having a high surface harness and a satisfactory abrasion resistance, a weather resistant ultraviolet absorptive laminated resinous article is disclosed. The resinous article includes a resin base, a base protective layer and a surface protective layer formed on at least one surface of the resin base, which base protective layer is composed of a cross-linked cured product. The base protective layer includes a polymer obtained by polymerizing a monomer component containing at least one selected from monomers having an ultraviolet absorptive group of the formula (1) or (2) in the description, and the surface protective layer is formed as an outermost layer of the resinous article.

8 Claims, No Drawings

ULTRAVIOLET ABSORPTIVE LAMINATED RESINOUS ARTICLE

This is a continuation of International Application PCT/JP99/05437, with an international filing date of Oct. 4, 1999.

BACKGROUND OF THE INVENTION

1. Field of the Invention

The present invention relates to ultraviolet absorptive laminated resinous articles which exhibit minimized coloring or deterioration induced by ultraviolet radiation, with satisfactory interlayer adhesion and improved abrasion resistance and weatherability.

2. Description of the Prior Art

Resinous films, resinous sheets, resin plates, and other resinous articles (hereinafter may be inclusively referred to as "resin plate") made of, for example, polycarbonates are excellent in transparency, impact resistance, heat resistance, flame resistance, and other properties. These resinous articles are in wide use for road constructive materials and building materials and are expected to be applied to other uses. However, the application of the resin plates is restricted since the resin plates are not so effective as metal plates, glass plates and the like in terms of surface hardness, abrasion resistance, solvent resistance and other surface properties. Strong demands have been therefore made to improve the surface properties of such base resin plates. A possible solution to improve the surface properties is a process of -coating the surface of a base resin plate with a surface treatment agent. Such a surface treatment agent include, for example, an ultraviolet-curable acrylic compound, a thermosetting melamine resin, or a thermosetting organopolysiloxane resin which form a hard resin layer on a surface of a base resin plate.

Of these proposed processes, coating the surface of the base resin plate with a thermosetting organopolysiloxane resin that provides typically high surface hardness and chemical resistance. Specifically, by coating the surface of a base resin plate with a partially hydrolyzed condensate of an organotrialkoxysilane alone, with a partially hydrolyzed condensate between a tetraalkoxysilane and an organotrialkoxysilane, or with a partially hydrolyzed condensate of an organotrialkoxysilane containing colloidal silica, the coated resin plate can be obtained with a satisfactory surface hardness. Such a coating constituent of the surface hard resin layer exhibits a satisfactory adhesion to a base resin plate when a base resin plate is made of a poly(methyl methacrylate) resin. However, when coating the surface of polycarbonate resin with these surface treatment agents, the coated hard resin layer tend to decrease its adhesion to the base resin plate and may be peeled from the base resin plate.

To improve the adhesion of such a hard resin layer, Japanese Examined Patent Application Publications No. 63-5155 and No. 63-52668, for example, each propose a technique of preliminarily treating the surface of a polycarbonate resin plate to form a primer layer. Indeed, the adhesion of the surface hard resin layer is improved by forming the surface resin layer on the primer layer, according to this process.

A second problem which generally arises is an insufficient weatherability, particularly deterioration and coloring of the resin plate upon exposure to ultraviolet radiation. An initial adhesion of the hard resin layer is improved by the aforementioned technique, but both the hard resin layer and the primer layer have no property to absorb ultraviolet radiation. Therefore transmitted ultraviolet radiation deteriorates the surface of the resin plate thereby introduces other problems such as deterioration of the improved adhesion of the hard resin layer and deterioration of weatherability such as coloring or decrease in strength. To prevent such ultraviolet radiation that deteriorates the resin from reaching the surface of the resin plate, for example, Japanese Examined Patent Application Publication No. 60-53701 and Japanese Examined Patent Application Publication No. 2-37938 each proposes a technique of adding an ultraviolet absorbent to components of a surface layer such as a primer layer or a surface hard resin layer, and absorbing the ultraviolet radiation by ultraviolet absorbent added layer. In addition, a variety of techniques to improve the composition of the surface hard resin layer or the primer layer have been proposed in order to prevent, for example, deterioration in solvent resistance of the surface layer induced by the added ultraviolet absorbent and to improve the adhesion of the surface layer to a base resin layer (e.g., Japanese Examined Patent Application Publication No. 1-7582, Japanese Examined Patent Application Publication No. 1-32246, Japanese Examined Patent Application Publication No. 1-18944, and Japanese Examined Patent Application Publication No. 2-37938). These techniques can prevent the ultraviolet-induced deterioration of the resin plate surface to some extent and can provide a somewhat satisfactory adhesion.

However, large amounts of an ultraviolet absorbent must be added to the surface hard resin layer and the primer layer in order to provide complete blockage of ultraviolet radiation within these layers. As a result, the surface hard resin layer and/or the primer layer is colored or is hazed to decrease the transparency of the surface hard resin plate, which transparency distinguishes the surface hard resin plate from others. In addition, the added ultraviolet absorbent bleeds out from the layer to deteriorate the appearance of the resin plate or to decrease the abrasion resistance. The bleed-out of the ultraviolet absorbent will result in a deteriorated interlayer adhesion between the surface hard resin layer and the primer layer or between the primer layer and the base resin layer. The ultraviolet absorbent itself does not have a significantly high hardness, and containing large amounts of the ultraviolet absorbent in the hard resin layer will decrease the hardness of the layer. Specifically, without the addition of an ultraviolet absorbent, the surface of the resin plate is deteriorated and the adhesion of the surface hard resin layer is decreased due to ultraviolet radiation. In contrast, the addition of an ultraviolet absorbent results in coloring or deterioration of the surface hardness. These problems have not been solved concurrently.

As a potential solution to these problems, Japanese Unexamined Patent Application Publication No. 9-3135 and Japanese Unexamined Patent Application Publication No. 10-34840, for example, propose the use of an acrylic resin in a surface layer, which acrylic resin is obtained by copolymerizing an acrylic monomer with a reactive ultraviolet absorbent. These techniques allow the use of large amounts of an ultraviolet absorbent. However, all the acrylic resins obtained by the copolymerization with an ultraviolet absorbent are thermoplastic and are insufficient in hardness as a coating layer for surface protection and have an insufficient abrasion resistance. In addition, satisfactory hot water resistance and weatherability cannot be significantly obtained.

Japanese Unexamined Patent Application Publication No. 4-106161 discloses a process for improving the heat resistance, abrasion resistance, surface hardness, surface gloss, and other properties. The process includes the steps of copolymerizing a monomer having an ultraviolet absorptive group to yield a copolymer, coating the surface of a base resin plate with the copolymer as a primer layer, and coating the surface of the primer layer with an organopolysiloxane as a hardcoat layer. The publication also discloses that a monomer having an ultraviolet stable group is preferably copolymerized, in addition to the monomer having an ultraviolet absorptive group.

According to these techniques, however, the constitutive ultraviolet absorptive copolymer is thermoplastic and the primer layer has an insufficient weatherability and a low abrasion resistance even if the surface of the primer layer is coated with a hardcoat layer. As a result, the hardcoat layer has also an insufficient weatherability and a low abrasion resistance. In addition, the adhesion between the primer layer and the hardcoat layer after a hot water resistance test or a weathering test is insufficient and a satisfactory interlayer adhesion cannot be significantly obtained.

Japanese Unexamined Patent Application Publication No. 7-286013 discloses a silyl-group-containing vinyl resin for coating. The vinyl resin is composed of a copolymer comprising a polymerizable silane monomer, another monomer, and a monomer having an ultraviolet stable group as monomer components. The publication states that the vinyl resin provides a coating which is excellent in weatherability, dirt resistance, hardness, and chemical resistance. However, the monomer having an ultraviolet stable group as a monomer component is incorporated in the resin in a relatively low content and the monomer having an ultraviolet stable group has an insufficient ultraviolet absorption property. The vinyl resin is therefore liable to color or to degrade upon exposure to ultraviolet radiation. If a coating of this resin is formed as a thick film to ensure a satisfactory ultraviolet absorption property, cracks are liable to form upon the formation of a surface protective layer on the coating, and the interlayer adhesion between the coating and a hardcoat layer is decreased in such a state as after a hot water resistance test or a weathering test.

U.S. Pat. No. 4,533,595 discloses an abrasion-resistant article of manufacture. This article is obtained by copolymerizing a monomer having an ultraviolet absorptive group to give a copolymer, forming a primer layer of the copolymer on the surface of a base, and forming a hardcoat layer from an organopolysiloxane on the primer layer. However, each constitutive ultraviolet absorptive copolymer of the base protective layer is thermoplastic and the primer layer has an insufficient weatherability and a low abrasion resistance even if the surface of the primer layer is coated with a hardcoat layer. As a result, the hardcoat layer has also an insufficient weatherability and a low abrasion resistance.

In addition, the adhesion between the primer layer and the hardcoat layer after a hot water resistance test or a weathering test is insufficient-and a satisfactory interlayer adhesion cannot be significantly obtained.

The invention has been accomplished to solve these problems that conventional techniques possess, and an object of the invention is to provide a laminated resinous article which has an improved weatherability without introducing ultraviolet-induced coloring, deterioration in surface hardness and interlayer adhesion and has excellent properties such as a high surface hardness and a satisfactory abrasion resistance.

SUMMARY OF THE INVENTION

In accordance with the present invention, the invention provides an ultraviolet absorptive laminated resinous article. The resinous article includes a resin base, a base protective layer formed on a surface of the resin base to be protected, and a surface protective layer formed on the base protective layer, and the base protective layer is composed of a cross-linked cured product. The base protective layer includes a polymer obtained by polymerizing a monomer mixture containing 5 to 70% by weight of at least one selected from monomers each having the following formula (1) or (2) and having an ultraviolet absorptive group:

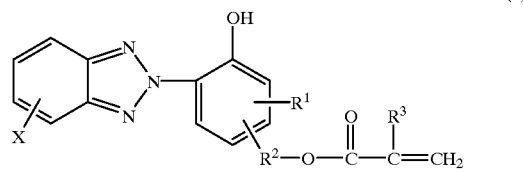

wherein $R^1$ is a hydrogen atom or a hydrocarbon group having 1 to 8 carbon atoms, $R^2$ is a lower alkylene group, $R^3$ is a hydrogen atom or a methyl group, and X is a hydrogen atom, a halogen, a hydrocarbon group having 1 to 8 carbon atoms, a lower alkoxy group, a cyano group, or a nitro group, provided that either $R^1$ or X is a hydrogen atom;

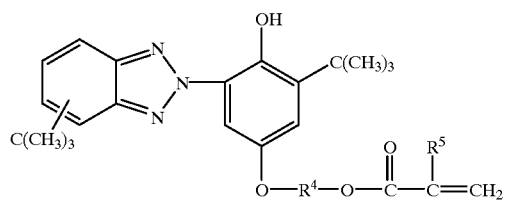

wherein $R^4$ is a lower alkylene group, and $R^5$ is a hydrogen atom or a methyl group.

The monomer component preferably includes at least one selected from monomers each having the following formula (3) or (4) and having an ultraviolet stable group:

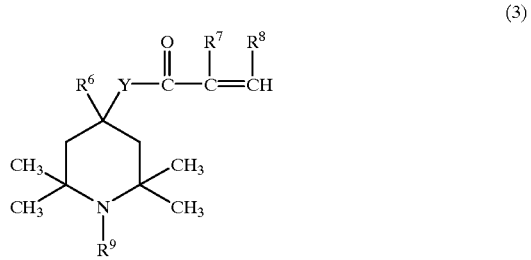

wherein $R^6$ is a hydrogen atom or a cyano group, $R^7$ and $R^8$ are each independently a hydrogen atom or a methyl group, $R^9$ is a hydrogen atom or a hydrocarbon group, and Y is an oxygen atom or an imino group;

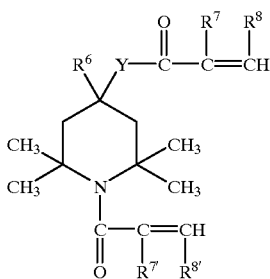

(4)

wherein $R^6$ is a hydrogen atom or a cyano group, $R^7$, $R^8$, $R^{7'}$, and $R^{8'}$ are each independently a hydrogen atom or a methyl group, and Y is an oxygen atom or an imino group.

The surface protective layer may be preferably a hardcoat layer to further improve, for example, weatherability, abrasion resistance, and hot water resistance. More preferably, the surface protective layer may include, as a component, at least one resin selected from silicone-based curable resins, and curable resins containing organic polymer-combined inorganic fine particles. The resulting laminated resinous article has a high surface hardness and a satisfactory abrasion resistance with a higher weatherability and a more satisfactory hot water resistance.

When any of the silicone-based curable resins, and curable resins containing organic polymer-combined inorganic fine particles is used as a component of the surface protective layer, additional monomer component to constitute the base protective layer may be preferably used as a copolymer component. The resulting resinous article has a further improved interlayer adhesion between the base protective layer and the surface protective layer. Such additional monomer components include monomers having a reactive silyl group, and more preferably monomers having a hydrolyzable silyl group. Specifically, the copolymer component is preferably at least one selected from monomers shown by the following formula (5) to (7):

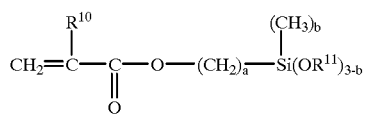

(5)

wherein $R^{10}$ is a hydrogen atom or a methyl group, $R^{11}$ is a hydrocarbon group having 1 to 6 carbon atoms, "a" is an integer of from 1 to 3, and b is 0 or 1;

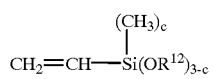

(6)

wherein $R^{12}$ has the same meaning as defined in $R^{11}$ or is an alkyloxyalkyl group, and c is 0 or 1;

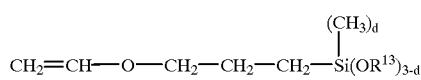

(7)

wherein $R^{13}$ has the same meaning as defined in $R^{11}$, and d is 0 or 1.

BRIEF DESCRIPTION OF THE DRAWINGS

DETAILED DESCRIPTION OF THE PREFERRED EMBODIMENTS OF THE INVENTION

The present inventors made intensive investigations to improve the surface hardness, abrasion resistance, weatherability, and other properties, which have been problems in conventional techniques, while maintaining satisfactory transparency, impact resistance, and other properties that a base resin inherently possesses. As a result, they found that the surface hardness, weatherability, and abrasion resistance of a base resin can be improved by forming a layer as a base protective layer on a resin base and forming a surface protective layer on the base protective layer, in which the base protective layer contains an ultraviolet absorptive polymer obtained by polymerizing a monomer component containing a specific amount of a monomer having a specific ultraviolet absorptive group. The present invention has been accomplished based on these findings.

Base resins for use in the invention include, but are not limited to, polycarbonate resins, acrylic resins, polyethylene resins, polyester resins, polypropylene resins, acrylonitrile-butadiene-styrene (ABS) resins, polystyrene resins, and vinyl chloride resins. The resin base may have any shape and may be prepared by any process. A designed resin base with, for example, a woodgrain printing can be also employed.

Components of the base protective layer formed on the resin base, and of the surface protective layer formed on the base protective layer will be described in detail later. The base protective layer is preferably composed of a cross-linked cured product to yield satisfactory weatherability, abrasion resistance, hot water resistance, and other properties as a primary coat for the surface protective layer. As a component of the surface protective layer, at least one resin selected from silicone-based curable resins, and curable resins having organic polymer-combined inorganic fine particles is preferably used. The resulting laminated resinous article has a high surface hardness and a satisfactory abrasion resistance with a further improved weatherability and hot water resistance.

One of main features of the invention is that a base protective layer containing a polymer is formed on a resin base, in which the polymer is obtained by polymerizing a monomer component containing 5 to 70% by weight of at least one selected from monomers of the formula (1) or (2) having an ultraviolet absorptive group. This configuration ensures that ultraviolet radiation is absorbed by the base protective layer before reaching the resin base, and inhibits ultraviolet-induced deterioration or discoloration of the resin base. The monomer does not bleed out as in conventional ultraviolet absorbents added as additives, and can yield a satisfactory interlayer adhesion.

The polymer may further comprise at least one selected from monomers of the formula (3) or (4) having an ultraviolet stable group as a monomer component. The copolymerization with a monomer of this type having an ultraviolet stable group can further improve the weatherability.

When a silicone-based curable resin or a curable resin containing organic polymer-combined inorganic fine particles is used as a component of the surface protective layer, copolymerization with an additional monomer component having a reactive silyl group is preferred to constitute the base protective layer. The additional monomer component is more preferably a monomer component having a hydrolyzable silyl group, typically preferably a reactive monomer component shown by any of the formulae (5) to (7). The adhesion of the resulting base protective layer to the surface protective layer can be further improved. The additional monomer component is used as a component in addition to the above monomer components of the base protective layer.

The monomers of the formula (1) having an ultraviolet absorptive group are benzotriazoles in which $R^1$ is a hydrogen atom or a hydrocarbon group having 1 to 8 carbon atoms, $R^2$ is a lower alkylene group, $R^3$ is a hydrogen atom or a methyl group, and X is a hydrogen, a halogen, a hydrocarbon group having 1 to 8 carbon atoms, a lower alkoxy group, a cyano group, or a nitro group; and either $R^1$ or X is a hydrogen atom.

In the above formula, the substituent $R^1$ includes, but is not limited to, hydrogen atom, methyl group, ethyl group, propyl group, isopropyl group, butyl group, isobutyl group, tert-butyl group, pentyl group, hexyl group, heptyl group, octyl group, and other chain hydrocarbon groups; cyclopropyl group, cyclopentyl group, cyclohexyl group, cycloheptyl group, cyclooctyl group, and other alicyclic hydrocarbon groups; phenyl group, tolyl group, xylyl group, benzyl group, phenethyl group, and other aromatic hydrocarbon groups. Practical examples of the substituent $R^2$ are alkylene groups each having 1 to 6 carbon atoms, including methylene group, ethylene group, trimethylene group, tetramethylene group, and other straight chain alkylene groups; and propylene group, 2-methyltrimethylene group, 2-methyltetramethylene group, and other branched chain alkylene groups. Illustrative substituents X are hydrogen; fluorine, chlorine, bromine, iodine, and other halogens; methyl group, ethyl group, propyl group, isopropyl group, butyl group, isobutyl group, tert-butyl group, pentyl group, hexyl group, heptyl group, octyl group, and other chain hydrocarbon groups; cyclopropyl group, cyclopentyl group, cyclohexyl group, cycloheptyl group, cyclooctyl group, and other alicyclic hydrocarbon groups; phenyl group, tolyl group, xylyl group, benzyl group, phenethyl group, and other aromatic hydrocarbon groups; methoxy group, ethoxy group, propoxy group, butoxy group, pentyloxy group, heptyloxy group, and other lower alkoxy groups having 1 to 6 carbon atoms; cyano group; and nitro group.

Illustrative monomers of the formula (1) having an ultraviolet absorptive group include, but are not limited to,
2-[2'-hydroxy-5'-(methacryloyloxymethyl)phenyl]-2H-benzotriazole,
2-[2'-hydroxy-5'-(methacryloyloxyethyl)phenyl]-2H-benzotriazole,
2-[2'-hydroxy-5'-(methacryloyloxypropyl)phenyl]-2H-benzotriazole,
2-[2'-hydroxy-5'-(methacryloyloxyhexyl)phenyl]-2H-benzotriazole,
2-[2'-hydroxy-3'-tert-butyl-5'-(methacryloyloxyethyl)phenyl]-²H-benzotriazole,
2-[2'-hydroxy-5'-tert-butyl-3'-(methacryloyloxyethyl)phenyl]-2H-benzotriazole,
2-[2'-hydroxy-5'-(methacryloyloxyethyl)phenyl]-5-chloro-2H-benzotriazole,
2-[2'-hydroxy-5'-(methacryloyloxyethyl)phenyl]-5-methoxy-2H-benzotriazole,
2-[2'-hydroxy-5'-(methacryloyloxyethyl)phenyl]-5-cyano-2H-benzotriazole,
2-[2'-hydroxy-5'-(methacryloyloxyethyl)phenyl]-5-tert-butyl-2H-benzotriazole, and
2-[2 '-hydroxy-5'-(methacryloyloxyethyl)phenyl]-5-nitro-2H-benzotriazole. Each of these monomers of the formula (1) having an ultraviolet absorptive group can be used alone or in combination with two or more of these monomers as appropriate.

Monomers of the formula (2) having an ultraviolet absorptive group are benzotriazoles in which the substituent $R^4$ is a lower alkylene group, and the substituent $R^5$ is a hydrogen atom or a methyl group.

Typical examples of the substituent $R^4$ in the above formula are alkylene groups each having 2 or 3 carbon atoms, including ethylene group, trimethylene group, and propylene group.

Illustrative monomers of the formula (2) having an ultraviolet absorptive group include, but are not limited to, 2-[2'-hydroxy-5'-(β-methacryloyloxyethoxy)-3'-tert-butylphenyl]-5-tert-butyl-2H-benzotriazole. Each of the monomers of the formula (2) having an ultraviolet absorptive group can be used alone or in combination with two or more of these monomers as appropriate.

The content of the monomer of the formula (1) or (2) having an ultraviolet absorptive group must range from 5 to 70% by weight based on the total weight of monomer components. The lower limit of the range is preferably 10% by weight, more preferably more than 20% by weight, and typically preferably equal to or more than 25% by weight. The upper limit of the range is preferably equal to or less than 60% by weight, and more preferably equal to or less than 50% by weight. A content of the monomer having an ultraviolet absorptive group less than 5% by weight will require a thick base protective layer in order to avoid the ultraviolet-induced degradation of the resin base. This may invite the formation of cracks when the surface protective layer is formed on the base protective layer or during a long-term use. In contrast, a content of the monomer having an ultraviolet absorptive group exceeding 70% by weight may invite deterioration of properties of the base protective layer.

Monomers of the formula (3) or (4) having an ultraviolet stable group are preferably used in the invention and are piperidines in which the substituent $R^6$ is a hydrogen atom or a cyano group, the substituents $R^7$, $R^8$, $R^{7'}$, and $R^{8'}$ are each independently hydrogen atom or a methyl group, the substituent $R^9$ is a hydrogen atom or a hydrocarbon group, and the substituent Y is an oxygen atom or an imino group.

Illustrative examples of the substituent $R^9$ include, but are not limited to, hydrogen atom and hydrocarbon groups each having 1 to 18 carbon atoms; including methyl group, ethyl group, propyl group, isopropyl group, butyl group, isobutyl group, tert-butyl group, pentyl group, hexyl group, heptyl group, octyl group, nonyl group, decyl group, undecyl group, dodecyl group, tridecyl group, tetradecyl group, pentadecyl group, hexadecyl group, heptadecyl group, octadecyl group, and other chain hydrocarbon groups; cyclopropyl group, cyclopentyl group, cyclohexyl group, cycloheptyl group, cyclooctyl group, and other alicyclic hydrocarbon groups; phenyl group, tolyl group, xylyl group, benzyl group, phenethyl group, and other aromatic hydrocarbon groups.

Typical examples of the monomers of the formula (3) having an ultraviolet stable group include,
4-(meth)acryloyloxy-2,2,6,6-tetramethylpiperidine,
4-(meth)acryloylamino-2,2,6,6-tetramethylpiperidine,
4-(meth)acryloyloxy-1,2,2,6,6-pentamethylpiperidine,
4-(meth)acryloylamino-1,2,2,6,6-pentamethylpiperidine,
4-cyano-4-(meth)acryloylamino-2,2,6,6-tetramethylpiperidine, 4-crotonoyloxy-2,2,6,6-tetramethylpiperidine, and
4-crotonoylamino-2,2,6,6-tetramethylpiperidine. Each of these monomers can be used alone or in combination with two or more of these monomers as appropriate. The monomers of the formula (3) having an ultraviolet stable group are not limited to the examples above.

Illustrative monomers of the formula (4) having an ultraviolet stable group are
1-(meth)acryloyl-4-(meth)acryloylamino-2,2,6,6-tetramethyl piperidine,
1-(meth)acryloyl-4-cyano-4-(meth)acryloylamino-2,2,6,6-tetramethylpiperidine, and
1-crotonoyl-4-crotonoyloxy-2,2,6,6-tetramethylpiperidine.
Each of these monomers may be used alone or in combination with two or more of these as appropriate. The monomers of the formula (4) having an ultraviolet stable group are not limited to the examples above.

The proportion of the monomer of the formula (3) or (4) having an ultraviolet stable group is not critical but is preferably in a range from 0.1 to 15% by weight, more preferable lower limit is 0.5% by weight, typically preferable lower limit is 1% by weight and more preferable upper limit is 5% by weight, typically preferable upper limit is 3% by weight based on the total weight of monomer components of the ultraviolet absorptive polymer constituent of the base protective layer. When the total weight of monomers having an ultraviolet stable group is less than 0.1% by weight, degradation of the base protective layer may not be sufficiently protected. In contrast, when the total weight of the monomers is exceeding 15% by weight, the properties of the base protective layer may be deteriorate.

A monomer having a reactive silyl group is copolymerized as an additional monomer component of the base protective layer in the invention. This additional monomer component most effectively exhibits its advantages when a silicone-based curable resin or a curable resin containing an organic polymer-combined inorganic fine particle is used as a component of the surface cured layer as described above. Of such monomers, typically preferred one is a monomer having a polymerizable double bond and a hydrolyzable silyl group in the molecule. The term "hydrolyzable silyl group" as used herein means a group that can form a silanol group by a hydrolysis reaction. Of such monomer components having the hydrolyzable silyl group, monomers of any of the formulae (5) to (7) are typically preferred. Each of these monomers can be used alone or in combination with two or more of these as appropriate.

Monomers of the formula (5) are acrylic monomers each having an alkoxysilyl group, and in the formula (5), $R^{10}$ is a hydrogen atom or a methyl group, $R^{11}$ is a hydrocarbon group having 1 to 6 carbon atoms (e.g., methyl group, ethyl group, propyl group, and other alkyl groups; vinyl group, isopropenyl group, allyl group, and other alkenyl groups; and phenyl group, and other aryl groups), "a" is an integer of 1 to 3, and b is 0 or 1.

Illustrative acrylic monomers having an alkoxysilyl group include, but are not limited to,
3-methacryloxypropyltrimethoxysilane,
3-methacryloxypropyltriethoxysilane,
3-methacryloxypropyltributoxysilane,
3-methacryloxypropyltriisopropoxysilane,
methacryloxymethyltrimethoxysilane,
methacryloxymethyltriethoxysilane,
methacryloxymethyltributoxysilane,
3-acryloxypropyltrimethoxysilane,
3-acryloxypropyltriethoxysilane,
3-acryloxypropyltributoxysilane,
acryloxymethyltrimethoxysilane,
acryloxymethyltriethoxysilane,
acryloxymethyltributoxysilane,
3-methacryloxypropylmethyldimethoxysilane,
3-methacryloxypropylmethyldiethoxysilane,
3-methacryloxypropylmethyldibutoxysilane,
methacryloxymethylmethyldimethoxysilane,
methacryloxymethylmethyldiethoxysilane,
methacryloxymethylmethyldibutoxysilane,
3-acryloxypropylmethyldimethoxysilane,
3-acryloxypropylmethyldiethoxysilane,
3-acryloxypropylmethyldibutoxysilane,
acryloxymethylmethyldimethoxysilane,
acryloxymethylmethyldiethoxysilane, and
acryloxymethylmethyldibutoxysilane. Of these monomers,
3-methacryloxypropyltrimethoxysilane and
3-methacryloxypropylmethyldimethoxysilane are typically preferred, because they can be easily handled and have a high reactivity and be crosslinked in a high density.

Monomers of the formula (6) are vinyl functional compounds having an alkoxysilyl group, and monomers of the formula (7) are vinyl functional alkoxysilane compounds. These compounds of the formula (6) or (7) are vinyl-functional monomers, in which each of $R^{12}$ and $R^{13}$ has the same meaning as defined in $R^{11}$ or is an alkyloxyalkyl group, and each of c and d is 0 or 1.

Illustrative examples of these vinyl functional monomers include, but are not limited to, vinyltrimethoxysilane,
vinyltriethoxysilane, vinyltributoxysilane,
vinyltriacetoxysilane, vinyptris(2-methoxyethoxy)silane,
vinpylmethyldimethoxysilaned vinylmethyldiethoxysilane
vinylmethyldibutoxysilane,
vinylmethylbisa(2-meathoxyethoxy)silane,
3-vinyloxypropyltrimethoxysilane,
3-vinyloxypropyltriethoxysilane,
3-vinyloxypropylmethyldimethoxysilane, and
3-vinyloxypropylmethyldiethoxysilane. Of these monomers,
vinyltrimethoxysilane, vinyltriethoxysilane, and
3-vinyloxypropyltrimethoxysilane are typically preferred, because they can be easily handled and have a high reactivity.

When the monomer having a hydrolyzable silyl group is employed as a copolymer component,.silanol groups formed by a hydrolysis reaction are condensed to each other to form a cross-linkable moiety in the resulting copolymer. This copolymer having a cross-linkable moiety and constituting the base. protective layer can be cured by heat to thereby improve the surf ace hardness and weatherability of the base protective layer. In addition, the presence of the silanol groups enhances adhesion of the base protective layer to the resin base and to the surface protective layer formed on the base protective layer. This advantage is typical to a surface protective layer made of a silicone-based curable resin or a curable resin containing an organic polymer-combined inorganic fine particle. As a result, the interlayer adhesion as a laminated resinous article can be markedly improved.

The proportion of the monomer component having a reactive silyl group is not critical, but is preferably 2 to 70% by weight, more preferable lower limit is 5% by weight and more preferable upper limit is 50% by weight to the weight of the copolymer that occupies a major proportion of the base protective layer, in order to effectively exhibit the operations of the monomer component having a reactive silyl group.

A copolymerization ratio of the monomer component having a reactive silyl group less than 2% by weight results in an insufficient adhesion of the base protective layer to the surface protective layer after a weathering test or a hot water resistance test. In contrast, the copolymerization ratio exceeding 70% by weight invites an excessively hard copolymer and :results in an insufficient adhesion to the surface protective layer after a weathering test, or a decreased storage stability of the copolymer.

The polymer having an ultraviolet absorptive group as a main component of the base protective layer for use in the invention can further comprise additional copolymerizable monomers, as far as the additional monomers do not deteriorate various required properties of the polymer. From the viewpoint of the weatherability, a monomer of the following formula (8) is preferably employed:

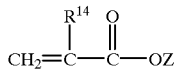

(8)

wherein $R^{14}$ is a hydrogen atom or a methyl group, and Z is a hydrocarbon group having 4 or more carbon atoms.

In the above formula, the substituent Z includes, cyclohexyl group, methylcyclohexyl group, cyclododecyl group, and other alicyclic hydrocarbon groups each having 4 or more carbon atoms; butyl group, isobutyl group, tert-butyl group, 2-ethylhexyl group, heptyl group, octyl group, nonyl group, decyl group, undecyl group, dodecyl group, pentadecyl group, octadecyl group, and other straight-chain or branched-chain alkyl groups each having 4 or more carbon atoms; bornyl group, isobornyl group, and other polycyclic hydrocarbon groups each having 4 or more carbon atoms. Among these groups, alicyclic hydrocarbon groups, branched-chain alkyl groups, and straight-chain alkyl groups having 6 or more carbon atoms are preferred.

Illustrative monomers of the formula (8) include, but are not limited to, cyclohexyl (meth)acrylate, methylcyclohexyl (meth)acrylate, cyclododecyl (meth)acrylate, tert-butylcyclohexyl (meth)acrylate, isobutyl (meth)acrylate, tert-butyl (meth)acrylate, lauryl (meth)acrylate, isobornyl (meth)acrylate, stearyl (meth)acrylate, and 2-ethylhexyl (meth)acrylate. Each of these monomers can be used alone or in combination with two or more of these.

The proportion of the monomer of the formula (8) is not critical but is preferably in a range from 3 to 70% by weight, and more preferably in a range from 5 to 50% by weight based on the total monomer components of the ultraviolet absorptive polymer. If the proportion is less than 3% by weight, the activity for improving the weatherability obtained by the copolymerization of this monomer cannot be significantly exhibited. In contrast, if the proportion exceeds 70% by weight, the interlayer adhesion of the base protective layer to the resin base might be deteriorated. The use of a monomer having an epoxy group or of vinyl acetate as a monomer component can more effectively enhance the interlayer adhesion of the base protective layer containing the resulting copolymer to the base resin and to the surface protective layer, and can yield a further higher weatherability. Preferred monomers having an epoxy group include glycidyl (meth)acrylate, methylglycidyl (meth)acrylate, (meth)acrylates containing an alicyclic epoxy group ("CYCLOMER M-100" and "CYCLOMER A-200", products of Daicel Chemical Industries, Ltd., Japan). The content of these monomers in the copolymer is preferably in a range from 1 to 10% by weight.

Other copolymerizable monomers include (meth)acrylic acid, itaconic acid, maleic acid, maleic anhydride, and other monomers containing a carboxyl group; 2-(meth)acryloyloxyethyl acid phosphate, and other acid phosphate-based monomers; 2-hydroxyethyl (meth)acrylate, 3-hydroxypropyl (meth)acrylate, 4-hydroxybutyl (meth)acrylate, caprolactone-modified hydroxy(meth)acrylates (e.g., trade name "PLACCEL FM", a product of Daicel Chemical Industries, Ltd.), and other monomers containing a group having an active hydrogen; methyl (meth)acrylate, ethyl(meth)acrylate, propyl(meth)acrylate, isopropyl(meth)acrylate, and other lower alkyl esters of (meth)acrylic acid; (meth)acrylamide, N,N'-dimethylaminoethyl(meth)acrylate, imide(meth)acrylate, N-methylol(meth)acrylamide, and other nitrogen-containing monomers; ethylene glycol di(meth)acrylate, and other monomers each having two polymerizable double bonds; vinyl chloride, vinylidene chloride, and other halogen-containing monomers; styrene, α-methylstyrene, vinyltoluene, and other aromatic monomers; and vinyl ether. The copolymerizable monomers are not limited to the examples above. Each of these monomers can be used alone or in combination with two or more of these as necessary.

Of these additional monomers, typically preferred to improve the properties of the base protective layer are monomers each having a polymerizable double bond and a cross-linkable functional group. Such monomers include, for example, monomers having a polymerizable double bond and a cross-linkable functional group. Such monomers include hydroxylalkyl (meth)acrylates and epoxy-group-containing (meth)acrylates. Copolymers obtained by the copolymerization of any of these monomers can be cured by a cross-linking reaction when the copolymer is used in combination with a polyisocyanate compound or another curing agent or a cationic polymerization catalyst, as described below. Thus, the surface hardness, weatherability, adhesion to the surface protective layer, of the base protective layer, and the abrasion resistance of the surface protective layer can be further improved. Among them, 2-hydroxyethyl (meth)acrylate, 4-hydroxybutyl (meth)acrylate, and other hydroxyalkyl (meth)acrylates are typically preferred from the viewpoint of low cost.

The content of the monomers having a polymerizable double bond and a cross-linkable functional group in the copolymer constituent of the base protective layer is preferably 1 to 50% by weight and more preferable lower limit is 3% by weight and more preferable upper limits 30% by weight. A content of the monomers less than 1% by weight results in an insufficient adhesion of the base protective layer to the surface protective layer after a weathering test or a hot water resistance test. In contrast, a content of the monomers exceeding 50% by weight provides an excessively hard copolymer and thus a decreased adhesion to the surface protective layer after a weathering test.

A technique for blending the monomers in the preparation of the copolymer constituent of the base protective layer is not critical, and any known or conventional blending technique can be employed.

In addition, a polymerization process for copolymerizing a monomer composition is not critical and includes solution polymerization, dispersion polymerization, suspension polymerization, emulsion polymerization, and other known polymerization processes. A solvent is used in the polymerization of the monomer composition according to the solution polymerization process. Such solvents include, but are not limited to, toluene, xylene, and other aromatic solvents; isopropyl alcohol, n-butyl alcohol, and other alcohol solvents; propylene glycol methyl ether, dipropylene glycol methyl ether, ethyl Cellosolve, butyl Cellosolve, and other ether solvents; butyl acetate, ethyl acetate, Cellosolve acetate, and other ester solvents; acetone, methyl ethyl ketone, methyl isobutyl ketone, diacetone alcohol, and other ketone solvents; and dimethyl formamide. Solvents for use in the polymerization are not limited to these solvents, but solvents which are erosive to the base rein should be avoided. Each of the solvents can be used alone or in combination as a mixture. The amount of the solvent may be selected from an appropriate range in consideration of, for example, the concentrations of products.

A polymerization initiator is used in the copolymerization of the monomer composition. Such polymerization initiators include, 2,2'-azobis-(2-methylbutyronitrile), tert-butyl peroxy-2-ethylhexanoate, 2,2'-azobisisobutyronitrile, benzdyl peroxide, di-tert-butyl peroxide, and other conventional radical polymerization initiators. The amount of the polymerization initiator is not critical and can be appropriately determined according to required characteristics of the polymer. The amount of the polymerization initiator is preferably in a range from 0.01 to 50% by weight, and more preferably in a range from 0.05 to 20. %.by weight relative to the total weight of the monomer components.

Where necessary, at least one chain transfer agent is effectively added to the monomer composition to control the molecular weight of the resulting copolymer. Such chain transfer agents include, for example, n-dodecyl mercaptan, t-dodecyl mercaptan, n-butyl mercaptan, 3-mercaptopropyltrimethoxysilane, 3-mercaptopropylmethyldimethxysilane, 3-mercaptopropylmethyldiethoxysilane, $(CH_3O)_3Si$—S—S—$Si(OCH_3)_3$, and $(CH_3O)_3Si$—$S_4$—$Si(OCH_3)_3$. The continuous addition of a chain transfer agent having a hydrolyzable silyl group in the molecule, such as 3-mercaptopropyltrimethoxysilane, into a solution containing the monomer mixture is preferred. The use of a chain transfer agent of this type can control the molecular weight and can introduce hydrolyzable silyl groups into terminals of vinyl monomers.

The reaction temperature is not critical but is preferably in a range from room temperature to 200° C., and more preferably in a range from 40° C. to 140° C. The reaction time may be appropriately set to a sufficient time to complete the polymerization reaction, according to the composition of the monomer composition and the type of the polymerization initiator.

The weight average molecular weight (Mw) of the ultraviolet absorptive polymer is not critical but is preferably in a range from 2,000 to 500,000, more preferably from 4,000 to 300,000, and typically preferably from 5,000 to 250,000. The weight average molecular weight is measured by gel permeation chromatography (GPC) with a polystyrene standard.

The formation of the base protective layer will now be described in detail. The above-prepared ultraviolet absorptive polymer is mixed, where necessary, with another polymer to yield a base protective layer-producing composition, and the composition is applied onto the resin base to yield a base protective layer. The base protective layer may be formed directly onto the resin base or may be formed onto a primer layer which is formed on the surface of the resin base. The composition can be applied onto the resin base by dipping, spray coating, blush coating, curtain flow coating, gravure coating, roller coating, spin coating, bar coating, electrostatic coating, or another technique. The applied base protective layer-producing composition is then cured by heating or by irradiation of ultraviolet rays or electron beam to yield a base protective layer.

The ultraviolet absorptive polymer alone can be cured when the copolymer contains, for example, an epoxy group or a (meth)acryloyl group in addition to the reactive silyl group. The copolymer of this type can be cured through cation polymerization or radical polymerization induced by heat or irradiation with ultraviolet rays or electron beam. Where necessary, a cation polymerization catalyst or a radical polymerization catalyst is used in the polymerization.

If the ultraviolet absorptive polymer cannot be cured by itself, a curing agent should be preferably added to the polymer. Such a curing agent is a compound or a polymer each containing two or more functional groups per molecule, which functional groups are reacted through cross-linking curing reaction with a curable functional group in the ultraviolet absorptive polymer. Such curable functional groups include, for example, a hydroxyl group, an amino group, a carboxyl group or its anhydride, an epoxy group, and an amido group. The curing agent may be selected and employed according to the type of the functional group in the ultraviolet absorptive polymer. For example, illustrative curing agents include polyisocyanate compounds or modified products thereof, aminoplast resins, epoxy resins, oxazoline-group-containing resins, and other cross-linking curing agents, when the functional group in the ultraviolet absorptive polymer is a carboxyl group or its anhydride; cross-linking curing agents made of compounds containing, for example, amines, carboxylic acids, amides, or N-methylolalkyl ethers, when the functional group is an epoxy group; polyisocyanate compounds or modified products thereof, epoxy resins, aminoplast resins and other cross-linking curing agents, when the functional group is a hydroxyl group or an amino group. Of these curing agents, isocyanate compounds, epoxy resins, and aminoplast resins are preferred in combination with the group having an active hydrogen.

When a monomer component having a reactive silyl group is used as the copolymer constituent of the base protective layer, the reactive silyl group introduced into the copolymer molecule allows the copolymer to be curable. However, a curing catalyst is effectively used to further enhance the curing. Such curing catalysts for use in the reaction include, but are not limited to, dibutyltin dilaurate, dibutyltin dimaleate, dioctyltin dilaurate, tin octanoate, and other organic tin compounds; phosphoric acid, monomethyl phosphate, monoethyl phosphate, monobutyl phosphate, monooctyl phosphate, monodecyl phosphate, dimethyl phosphate, diethyl phosphate, dibutyl phosphate, dioctyl phosphate, didecyl phosphate, and other phosphoric acid or phosphoric esters; alkyl titanates; tris(ethyl acetoacetate) aluminium, and other organic aluminium compounds; tetrabutyl zirconate, tetrakis(acetylacetonato)zirconium, tetraisobutyl zirconate, butoxytris(acetylacetonato)zirconium, and other organic zirconium compounds; maleic acid, adipic acid, azelaic acid, sebacic acid, itaconic acid, citric acid, succinic acid, phthalic acid, trimellitic acid, pyromellitic acid, and anhydrides of these acids, p-toluenesulfonic acid, and other acidic compounds; hexylamine, di-2-ethylhexylamine, N,N-dimethyldodecylamine, dodecylamine, and other amines; mixtures or reaction products between these amines and acidic phosphoric esters; sodium hydroxide, potassium hydroxide, and other alkaline compounds.

Typically preferred examples of these curing catalysts are organic tin compounds, acidic phosphoric esters, mixtures or reaction products between an acidic phosphoric ester and an amine, saturated or unsaturated polycarboxylic acids or anhydrides thereof, reactive silicon compounds, organic titanate compounds, organic aluminium compounds, and mixtures of these compounds, because these compounds have a particularly high catalytic activity.

The proportion of the curing catalyst to the copolymer is preferably in a range from 0.01 to 10% by weight and more preferably in a range from 0.05 to 5% by weight relative to a monomer component unit having a reactive silyl group in the copolymer.

Where necessary, the base protective layer-producing composition containing the copolymer having an introduced reactive silyl group may effectively further comprise a dehydrating agent to suppress hydrolysis of the silyl group during storage and subsequent deterioration of storage stability. Such dehydrating agents include, but are not limited to, methyl orthoformate, ethyl orthoformate, methyl orthoacetate, ethyl orthoacetate, methyltrimethoxysilane, 3-methacryloxypropyltrimethoxysilane, vinyltrimethoxysilane, methyl silicate, ethyl silicate, and other hydrolyzable ester compounds. Each of these compounds can be-used alone or in combination with two or more of these. These hydrolyzable ester compounds can be added to a copolymerization system in any stage prior to, during, or after the copolymerization, when the composition contains a vinyl-based monomer component having a reactive silyl group as a copolymerizable component.

The polymers (i.e., ultraviolet absorptive polymers) to be a main component of the base protective layer in the invention are as described above. According to the invention, each of these ultraviolet absorptive polymers can be used alone or in combination with any of additional polymers. The ratio of the additional polymers to main component in the base protective layer is preferably 40% or less, more preferably 30% or less, and most preferably 20% or less by weight. Such additional polymers are other thermoplastic polymers, or thermosetting polymers that can be cross-linked and cured alone or by the aid of a cross-linking agent. The type and the amount of the additional polymers can be appropriately selected according to the application and required characteristics of the invented resinous article. Such additional polymers include, but are not limited to, vinyl chloride resins, polyester resins, acrylic resins, silicon resins, and other thermoplastic polymers; urethane resins, aminoplast resins, silicon resins, epoxy resins, and other thermosetting polymers that can be cured alone; polyester resins, acrylic resins, epoxy resins, and other thermosetting resins that are cured by the aid of a curing agent.

Each of the cross-linking agents for use herein can be employed alone or in combination with two or more of these. The amount of the curing agent may be determined according to, for example, the type of the curing agent, and the molar ratio of a curable functional group in the base protective layer to a functional group in the curing agent is preferably in a range from 0.8 to 1.2. A cross-linking catalyst may be added to a reaction system to enhance a cross-linking reaction. Such cross-linking catalysts include, for example, salts, inorganic substances, organic substances, acid substances, and alkali substances.

When the base protective layer is cured by heating, the temperature depends on the type of the cross-linking functional group or the type of the curing agent for use in the reaction, and the curing temperature is preferably in a range of, for example, from room temperature to 250° C.

When the base protective layer is cured by ultraviolet irradiation, a curing process may be determined according to, for example, the species of a used photopolymerization initiator and a light source for generating ultraviolet rays, and the distance between the light source and a surface to be applied. For example, the base protective layer is cured by irradiating ultraviolet radiation having a wavelength of 1,000 to 8,000 angstroms for, generally, several seconds, and at longest for several ten seconds.

Alternatively, the base protective layer may be cured by electron beam irradiation, for example, by irradiating an electron beam at an accelerating voltage of, usually, 50 to 1,000 keV and preferably 100 to 300 keV at an absorbed dose of about 1 to 20 Mrad. The electron beam may be irradiated in the air but should be preferably irradiated in an inert gas such as nitrogen gas. If necessary, the base protective layer may be further heated after ultraviolet irradiation or electron beam irradiation to further enhance the curing.

The thickness of the base protective layer depends on the amount of copolymerized monomers having an ultraviolet absorptive group, according to the Lambert-Beer's law and is not critical as far as satisfying a desired weatherability of the resin base or required properties of the surface protective layer. The thickness should preferably fall in a range from 0.5 to 200 $\mu$m, more preferably from 1 to 100 $\mu$m, and typically preferably from 2 to 30 $\mu$m. A thickness of the base protective layer exceeding 200 $\mu$m will decrease an application speed and may deteriorate inherent properties of the resin base. In contrast, a thickness of the base protective layer less than 0.5 $\mu$m will inhibit a uniform application of the composition onto the resin base and may deteriorate the ultraviolet absorption performance.

Another feature of the invention is a surface protective layer formed on the base protective layer. According to the invention, the ultraviolet absorptive polymer constituent of the base protective layer is a curable resin, and preferably a curable resin having reactive silyl group, and this configuration improves the hardness, hot water resistance, weatherability, and other properties. In addition, the surface protective layer having a high surface hardness formed on the base protective layer can dramatically improve the surface hardness, abrasion resistance and weatherability with satisfactory hardness, hot water resistance, and weatherability of the primary layer.

A component resin of the surface protective layer is not critical but is preferably at least one resin selected from silicone-based curable resins, and curable resins having organic polymer-combined inorganic fine particles. These resins can provide satisfactory surface hardness, weatherability, abrasion resistance, interlayer adhesion, and other properties.

Such silicone-based curable resins are resins each having a siloxane bond and include, for example, partial hydrolysates of a trialkoxysilane and a tetraalkoxysilane or alkylated products of these compounds; hydrolyzed products of a mixture of a methyltrialkoxysilane and a phenyltrialkoxysilane; and products of partial hydrolysis and condensation of an organotrialkoxysilane containing colloidal silica. Such silicone-based curable resins are commercially available as, for example, "Si COAT 2" (a product of Daihachi Chemical Industry Co., Ltd., Japan); "TOSGARD 510", "UVHC 8553", "UVHC 8556", and "UVHC 8558" (products of Toshiba Silicone Corporation, Japan); "KP-851", "KP-854", "X-12-2206", "X-12-2400", and "X-12-2450" (products of Shin-Etsu Silicones, Japan); "SOLGARD NP 720", "SOLGARD NP 730", and "SOLGARD RF 0831" (products of Nippon Dacro Shamrock Co., Ltd.). These resins contain an alcohol or other products formed in a condensation reaction. Where necessary, the resins can be further dissolved or dispersed in an appropriate organic solvent, water, or a mixture of these substances. Such organic solvents for use in the dissolution or dispersion include, but are not limited to, lower fatty acid alcohols, polyhydric alcohols and ethers and esters thereof. The surface protective layer may further comprise a variety of surfactants to yield a smooth surface. Such surfactants include, for example, siloxane-based surfactants, alkyl fluoride-based surfactants, and other surfactants.

The term "organic polymer-combined inorganic fine particle" means a composite inorganic fine particle having an organic polymer fixed on the surface of the inorganic fine particle. When the surface protective layer is formed from a curable resin containing the fine particle, the surface hardness and other properties of the resultant product can be improved. Practical examples and details of production processes of the organic polymer-combined inorganic fine particle are described in Japanese Unexamined Patent Application Publication No. 7-178335, Japanese Unexamined Patent Application Publication No. 9-302257, and Japanese Unexamined Patent Application Publication No. 11-124467.

Curable resins to be incorporated with organic polymer-composite inorganic fine particles are not critical and include, for example, melamine resins, urethane resins, alkyd resins, acrylic resins, and multifunctional acrylic resins. Such multifunctional acrylic resins include polyol acrylates, polyester acrylates, urethane acrylates, epoxy acrylates, and other resins.

Such curable resins containing the organic polymer-combined inorganic fine particles are commercially available as, for example, "UWC-3300" and "UWC-3600" (products of Nippon Shokubai Co., Ltd., Japan).

The surface protective layer is formed by applying a film of a layer-producing composition onto the surface of the base protective layer and heating the applied film (heat curing process), or irradiating an active energy ray such as ultraviolet rays, electron beams or radioactive rays to the applied film (active energy ray curing process). Of these processes, silicone-based curable resins are mainly cured by the heat curing process, and curable resins containing organic polymer-combined inorganic fine particles are generally cured by the heat curing process or the active energy ray curing process using ultraviolet rays or electron beams. Generally, the heat curing process is inferior to the active energy ray curing process in that the former requires a longer time for the base protective layer to be cured. However, if the base protective layer is excessively cured, the interlayer adhesion between the base protective layer and the surface protective layer may be decreased after a hot water resistance test or a weathering test. Accordingly, the curing time should be preferably selected appropriately.

The layer-producing composition for the formation of the surface protective layer is applied to the resinous article by, for example, dipping, spray coating, flow coating, roller coating, or spin coating. To improve the interlayer adhesion, the surface protective layer may be formed on an intermediate layer such as an undercoat, a primer layer, or an adhesive layer. Silane coupling agent (e.g., "A-187", "A-189", "A-1100", and "A-1120", trade names, products of Nippon Unicar Co., Ltd., Japan) and other additives can be added to the composition.

The thickness of the surface protective layer is in a range from 0.1 to 200 $\mu$m, preferably in a range from 0.5 to 100 $\mu$m, and typically preferably in a range from 1 to 50 $\mu$m. A thickness of the surface protective layer less than 0.1 $\mu$m results in an excessively low surface hardness to exhibit advantages as a surface protective layer. In contrast, a thickness of the surface protective layer exceeding 200 $\mu$m deteriorates the properties, particularly bending strength and other mechanical strengths, of the resin plate.

The base protective layer and the surface protective layer may further comprise a variety of additives in addition to the above additives. Such additives include, but are not limited to, leveling agents; titanium white, and other pigments; pigment dispersants; antioxidants; viscosity modifiers; light stabilizers; metal deactivators; peroxide decomposing agents; fillers; plasticizers; lubricants; rust inhibitors; fluorescent whiteners; flow control agents; and antistatic agents, for use in paints and other layer-producing compositions.

The invention has the feature in that a specific base protective layer made of a cross-linked and cured product is formed on a surface of the resin base to be protected, and a surface protective layer is formed on the base protective layer, as described above. In addition, the properties as a laminate resinous article can be further effectively improved by imparting a heat shielding property to the resin base. For example, resin bases obtained in the following manners are also effectively used. A heat shielding substance is kneaded into a composition prior to molding of a resin base and the resulting composition is molded to yield a film or sheet resin base having a heat shielding property. Alternatively, a coating composition containing a, heat shielding substance is applied onto one or both surfaces of a molded resin base to yield a resin base having a,heat shielding property.

Such heat shielding substances for use in the invention are not critical as far as substances have absorption in a near-infrared region (700 to 1800 nm). However, in some uses, substances exhibiting less coloring in a visible light region (400 to 700 nm) and having a large molar absorption coefficient are preferred. Each of these substances can be employed alone or in combination with two or more of these. Separately, in some applications, toning in a visible light region may be performed or a substance having absorption in a visible light region may be incorporated to color the resinous article to a target color.

Such heat shielding substances include organic heat shielding substances and inorganic heat shielding substances.

The total amount of the organic heat shielding substances to be used depends on the application, difference in molar absorption coefficients of the substances to be used or combination of the substances and cannot be uniquely determined. The total amount of the organic heat shielding substances is generally in a range from 0.01 to 50 g/m$^2$, and typically preferably in a range from 0.1 to 20 g/m$^2$ relative to the base resin.

Preferred organic heat shielding substances include metal complex compounds, phthalocyanines, naphthalocyanines, aminium salts, anthraquinones, and naphthoquinones. Of these substances, typically preferred are phthalocyanines having a nitrogen atom bonded to at least one, preferably at least four, of phthalocyanine skeletons (e.g., phthalocyanines substituted with a phenylamino group or an alkylamino group). Phthalocyanines described in, for example, Japanese Unexamined Patent Application Publication No. 5-345861, Japanese Unexamined Patent Application Publication No. 6-264050, and Japanese Unexamined Patent Application Publication No. 6-25548 can be advantageously employed.

The inorganic heat shielding substances include, but are not limited to, metals, metallic nitrides, metallic nitride-oxides, metallic carbides, and metallic oxides. Typically preferred inorganic heat shielding substances are fine particles of metallic oxides, because these substances have a satisfactory solubility for a dispersion medium and a good weatherability. Such preferred metallic oxides include, for example, indium oxide or indium oxide-based oxides comprising indium oxide and a tetravalent metallic element and/or F; tin oxide or tin oxide-based oxides comprising tin oxide and a pentavalent metallic element and/or F; zinc oxide-based oxides comprising zinc oxide and at least one element selected from Group IIIB metallic elements, Group IVB metallic elements, and other trivalent metallic elements, tetravalent metallic elements, F, and C; cadmium stannate, and other metallic oxides.

Of the indium oxide-based oxides comprising indium oxide and a tetravalent metallic oxide and/or F, typically preferred are indium oxide-based oxides comprising indium oxide and tin, a tetravalent metallic element. The ratio of the metallic element to tin in the metallic oxides is preferably in a range from 0.1 to 20% by weight. Practical examples of the zinc oxide-based oxides comprising zinc oxide and at least one element selected from Group IIIB metallic elements, Group IVB metallic elements, and other trivalent metallic elements, tetravalent metallic elements, F, and C are zinc oxides containing at least one selected from Al, Ga, In, and Tl as Group IIIB metallic elements, Si, Ge, Sn, and Pb as Group IVB metallic elements, and Ti, V, Cr, Mn, Fe, Co, Zr, Hf, La, and other trivalent and tetravalent metallic elements. The ratio of each metallic element to zinc in the metallic oxides is preferably in a range from 0.1 to 20% by weight.

These metallic oxide fine particles should preferably have a mean particle diameter of 0.1 $\mu$m or less, more preferably 0.05 $\mu$m or less, and particularly preferably 0.03 $\mu$m or less, as such fine particles can provide an excellent transparency.

Of the metallic oxides, zinc oxide-based oxides are available at low cost and are desirable. Especially, zinc oxide-based oxides containing at least one element selected from Group IIIB metallic elements and Group IVB metallic elements have a high transparency in the visible light region and have a satisfactory heat shielding property, and can be advantageously employed. The zinc oxide-based oxides are desirable in that they can have an ultraviolet shielding property by changing the species and amount of the metallic element to be incorporated.

EXAMPLES

The invention will be further illustrated in detail with reference to several inventive examples and comparative examples below which are not intended to limit the scope of the invention. All parts and percentages in the examples and comparative examples are by weight unless otherwise specified.

Synthesis of Ultraviolet Absorptive Polymer

Synthesis Example 1

Into a 500-ml flask with a stirrer, a dropping inlet, a thermometer, a condenser, and a nitrogen-gas-inlet, 5 parts of 2-[2'-hydroxy-5'-(methacryloyloxyethyl)phenyl]-2H-benzotriazole, 30 parts of methyl methacrylate, 24 parts of butyl acrylate, 30 parts of n-butyl methacrylate, 10 parts of 2-hydroxyethyl methacrylate, 1 part of methacrylic acid, and 80 parts of dipropylene glycol methyl ether were placed. A nitrogen gas was introduced into the flask and the charged mixture was heated up to 110° C., with stirring. A mixture of 1 part of t-butyl peroxy-2-ethylhexanoate as an initiator and 20 parts of dipropylene glycol methyl ether was then added dropwise to the charged mixture over 2 hours, and the resulting mixture was heated for further 2 hours after the completion of addition to yield a 49.7% solution of an acrylic resin. This ultraviolet absorptive polymer (Polymer 1) had a weight average molecular weight of 48,000. Table 1 shows the types and compositions of the used monomer compositions, and the characteristics of the prepared polymers.

Synthesis Examples 2 to 10

A series of ultraviolet absorptive polymers (Polymers 2 to 10) were prepared in the same manner as in Synthetic Example 1, except for using the compositions and amounts of monomer compositions indicated in Table 1. In Synthesis Example 7, an ultraviolet absorptive polymer was synthetically obtained in the same manner as in Synthetic Example 1, and a gaseous mixture of nitrogen and oxygen was introduced into the flask. To the ultraviolet absorptive polymer, a mixture of 15 parts of acrylic acid, 0.2 part of tetraphenylphosphonium bromide, and 0.01 part of methoquinone was added dropwise at 110° C. over 30 minutes with stirring. The reaction was continued for subsequent 4 hours to yield Polymer 7 having an acryloyl group in its side chain.

TABLE 1

| | Syn. Ex. 1 | Syn. Ex. 2 | Syn. Ex. 3 | Syn. Ex. 4 | Syn. Ex. 5 | Syn. Ex. 6 | Syn. Ex. 7 | Syn. Ex. 8 | Syn. Ex. 9 | Syn. Ex. 10 |
|---|---|---|---|---|---|---|---|---|---|---|
| Curing Type | thermo-setting | thermo-setting | thermo-setting | thermo-setting | thermo-setting | thermo-plastic | radiation cure | thermo-plastic | thermo-setting | thermo-setting |
| UVA 1 | 5 | | 30 | 30 | 50 | 70 | 5 | | | 20 |
| UVA 2 | | 10 | | | | | | | | |
| HALS 1 | | 3 | 1 | 1 | 1 | | 2 | | | 3 |
| HALS 2 | | | | | | 1 | | | | |
| CHMA | | | 25 | | 20 | 10 | 20 | | 40 | |
| MMA | 30 | 35 | 14 | 34 | 6 | | 10 | 50 | 30 | 25 |
| BA | 24 | 25 | | | 8 | | 9 | 25 | 30 | |
| IA | | | | | | 10 | | | | 25 |
| n-BMA | 30 | 16 | 20 | 15 | 5 | | 18 | 20 | 19 | 16 |
| HEMA | 10 | 10 | 10 | 10 | 10 | | | | 10 | 10 |
| MAA | 1 | 1 | | | | | | | 1 | 1 |
| VAc | | | | 5 | | | | | | |
| GMA | | | | 5 | | | 20 | | | |
| Initiator | 1 | 4 | 1 | 1 | 2 | 0.5 | 4 | 0.5 | 2 | 4 |
| Reaction Solvent 1 | 100 | 100 | 100 | 100 | 100 | 100 | | 100 | 100 | 100 |
| Reactlon Solvent 2 | | | | | | | 100 | | | |
| Solids (%) | 49.7 | 50.0 | 49.8 | 49.8 | 50.1 | 49.7 | 49.7 | 49.6 | 49.9 | 50.0 |
| Number Average Molecular Weight | 12,000 | 5,000 | 13,000 | 14,500 | 8,000 | 17,000 | 5,500 | 15,000 | 9,000 | 4,500 |
| Weight Average Molecular Weight | 48,000 | 15,000 | 53,000 | 71,000 | 17,000 | 85,000 | 12,000 | 102,000 | 25,000 | 14,000 |

UVA 1:
  2-[2'-hydroxy-5'-(methacryloyloxyethyl)phenyl]-2H-benzotriazole
UVA 2:
  2-[2'-hydroxy-5'-(β-methacryloyloxyethoxy)-3'-tert-butylphenyl]-5-tert-butyl-2H-benzotriazole
HALS 1:
  4-methacryloyloxy-2,2,6,6-tetramethylpiperidine
HALS 2:
  1-methacryloyl-4-methacryloylamino-2,2,6,6-tetramethylpiperidine
CHMA: cyclohexyl methacrylate
MMA: methyl methacrylate
BA: butyl acrylate This ultraviolet absorptive copolymer (Copolymer 11) had a reactive silyl group. Table 2 shows the types and compositions of the used monomer compositions, and the characteristics of the prepared copolymers.

Synthesis Examples 12 to 17

A series of ultraviolet absorptive copolymers (Copolymers 12 to 17) were prepared in the same manner as in Synthetic Example 11, except for using the compositions and amounts of monomer compositions indicated in Table 2. However, the copolymer according to Synthesis Example 15 had no ultraviolet absorptive property, and the copolymer according to Synthesis Example 16 contained no reactive silyl group.

TABLE 2

|  | Syn. Ex. 11 | Syn. Ex. 12 | Syn. Ex. 13 | Syn. Ex. 14 | Syn. Ex. 15 | Syn. Ex. 16 | Syn. Ex. 17 |
|---|---|---|---|---|---|---|---|
| Curing Type | thermo-setting | thermo-setting | thermo-setting | thermo-setting | thermo-setting | thermo-plastic | thermo-setting |
| UVA 1 | 10 |  | 30 | 30 |  | 30 | 20 |
| UVA 2 |  | 50 |  |  |  |  |  |
| HALS 1 |  |  | 1 | 1 |  | 1 |  |
| HALS 2 |  | 1 |  |  |  |  |  |
| KBM 503 | 5 | 10 | 40 | 40 | 40 |  | 5 |
| MMA | 80 | 30 | 24 | 19 | 60 | 69 | 70 |
| CHMA |  |  | 5 |  |  |  |  |
| BA | 5 | 9 |  |  |  |  | 5 |
| VAc |  |  |  |  | 5 |  |  |
| GMA |  |  |  |  | 5 |  |  |
| Initiator | 0.5 | 3 | 0.5 | 0.5 | 0.5 | 0.5 | 0.5 |
| Reaction Solvent | 150 | 150 | 150 | 150 | 150 | 150 | 150 |
| Solid (%) | 40.0 | 39.8 | 40.1 | 40.0 | 40.1 | 39.9 | 39.8 |
| Weight Average Molecular Weight | 210,000 | 35,000 | 150,000 | 145,000 | 180,000 | 160,000 | 190,000 | n-BMA: n-butyl methacrylate
IA: imide acrylate ("ARONIX TO-1429", a product of Toa Gosei Co., Ltd., Japan)
HEMA: 2-hydroxyethyl methacrylate
MAA: methacrylic acid
GMA: glycidyl methacrylate
VAc: vinyl acetate
Initiator: tert-butyl peroxy-2-ethylhexanoate
Reaction solvent 1: dipropylene glycol methyl ether
Reaction solvent 2: butyl acetate Synthesis Example 11

Into a 500-ml flask with a stirrer, a dropping inlet, a thermometer, a condenser, and a nitrogen-gas-inlet, 10 parts of 2-[2'-hydroxy-5'-(methacryloyloxyethyl)phenyl]-2H-benzotriazole, 5 parts of 3-methacryloxypropyltrimethoxysilane ("KBM 503", a product of Shin-Etsu Chemical Co., Ltd., Japan), 80 parts of methyl methacrylate, 5 parts of butyl acrylate, and 120 parts of dipropylene glycol methyl ether were placed. A nitrogen gas was introduced into the flask and the charged mixture was heated to 90° C. with stirring. A mixture of 0.5 parts of t-butyl peroxy-2-ethylhexanoate as an initiator and 30 parts of dipropylene glycol methyl ether was added dropwise to the charged mixture over 2 hours, and the resulting mixture was heated for further 2 hours after the completion of addition. The reaction mixture was heated to 120° C. and was held at the same temperature for 1 hour to yield a 40% solution of an acrylic resin. The resulting copolymer had a weight average molecular weight of 210,000.

UVA 1:
  2-[2'-hydroxy-5'-(methacryloyloxyethyl) phenyl]-2H-benzotriazole
UVA 2:
  2-[2'-hydroxy-5'-(β-methacryloyloxyethoxy)-3'-tert-butylphenyl]-5-tert-butyl-2H-benzotriazole
HALS 1:
  4-methacryloyloxy-1,2,2,6,6-pentamethylpiperidine
HALS 2:
  1-methacryloyl-4-methacryloylamino-2,2,6,6-tetramethylpiperidine
KBM 503: 3-methacryloxypropyltrimethoxysilane (a product of Shin-Etsu Chemical Co., Ltd., Japan)
CHMA: cyclohexyl methacrylate
MMA: methyl methacrylate
BA: butyl acrylate
VAc: vinyl acetate
GMA: glycidyl methacrylate
Initiator: tert-butyl peroxy-2-ethylhexanoate
Reaction Solvent: dipropylene glycol methyl ether Example 1

To 100 parts of the ultraviolet absorptive polymer obtained in Synthesis Example 1, 7 parts of a curing agent A, and 0.01 part of a leveling agent ("BYK 300", a product of Big Chemie) were added. The resulting mixture was stirred sufficiently and was adjusted to a predetermined viscosity to yield an acrylic resin solution. The surface of a polycarbonate resin plate was cleaned with ethyl alcohol, and a film of the acrylic resin solution was applied to a coating thickness of 15 μm onto the surface of the polycarbonate resin plate. The applied film was dried in air and was then heated and cured at 80° C. for 3 minutes to form a base protective layer. Onto the base protective layer, a film of a silicone-based hardcoat composition ("TOSGARD 510", a product of Toshiba Silicone Corporation, Japan) was applied to a coating thickness of 5 μm, and the applied film was heated and cured at 120° C. for 2 hours to yield a surface protective layer. The properties of the prepared ultraviolet absorptive laminated resin plate were evaluated according to the following test methods.

[Weather Resistance Test]

A test piece was exposed to a weather Resistance test for 2,000 hours or for 8,000 hours using a Sunshine Weathermeter with a Sunshine Super Long-Life Carbon (products of Suga Test Instruments, Japan) at a constant temperature of 63° C. with a repeated cycle of non-rainfall for 2 hours and rainfall for 18 minutes. After the weathering test, the interlayer adhesion, surface hardness, and yellowing degree of the test piece were determined in the following manners.

[Interlayer Adhesion]

A coated film to be tested was cross-cut to form 100 grids (each 1 mm$^2$), and a cellophane tape was brought into intimate contact with the cross-cut area, and the adhered cellophane tape was then rapidly peeled in a direction perpendicular to the cross-cut film. The number of remained grids not peeled was counted, and the interlayer adhesion was evaluated by the number of remained grids relative to the total number of grids, 100, according to the following criteria.

A (excellent coating adhesion): 100 grids remained (all remained)

B (weak adhesion): 99 to 70 grids remained (partially peeled)

C (no adhesion): 70 or less grids remained (almost peeled)

[Yellowness (Y1)]

According to Japanese Industrial Standards (JIS) K-7103, a yellowness (Y1) of a test piece at an atmosphere temperature of 23° C. was determined. The yellowness indicates coloring (particularly yellowing) of the test piece. A test piece having a yellowness exceeding 4 shows a yellowish color even by visual observation.

[Yellowing Degree (ΔY1)]

A yellowing degree of a test piece was calculated according to the following equation. The yellowing degree indicates a change from an initial yellowness.

Yellowing Degree (ΔY1)=(Yellowness after Test)−(Initial Yellowness)

A large yellowing degree (ΔY1) indicates the test piece was colored as compared with the initial yellowness (the yellowness was increased). A test piece having a yellowing degree (ΔY1) exceeding 4 clearly shows coloring even by visual observation.

[Surface Hardness]

A test piece was abraded using a Taber type abrasion tester with a truck wheel CS-10F according to a method described in American Society for Testing and Materials (ASTM) D 1044 under a test load of 500 gf, and abrasion was repeated 500 times. A change in haze of an abraded portion of the test piece between before and after the test was determined according to a method described in JIS K-7105. A surface hardness was evaluated according to the following criteria.

A (sufficient surface hardness): haze change of 10% or less

B (somewhat abradable): haze change of 10 to 20%

C (abradable): haze change of 20% or more

[Hot Water Resistance]

A test piece was dipped in a boiling water for 2 hours or for 4 hours, and was then subjected to a test similar to the interlayer adhesion test. The hot water resistance was evaluated according to the same criteria as in the interlayer adhesion test.

Examples 2 to 10, Comparative Examples 1 to 3

A series of ultraviolet absorptive laminated resin plates were prepared in the same manner as in Example 1, by forming a base protective layer containing a predetermined polymer onto a resin base shown in Tables 3 and 4, and forming a surface protective layer (hardcoat layer) composed of a predetermined curable resin onto the base protective layer. The properties of the laminated resin plates were evaluated in the same manner as in Example 1, and the results are shown in Tables 3 and 4.

TABLE 3

| Resin Base | Example 1 poly-carbonate | Example 2 poly-carbonate | Example 3 poly-carbonate | Example 4 poly-carbonate |
|---|---|---|---|---|
| Base Protective Layer | | | | |
| Used Polymer | Polymer 1 | Polymer 2 | Polymer 3 | Polymer 5 |
| Additive Type UV Absorbent (part) | — | — | — | — |
| Curing Agent Type | curing agent A | curing agent C | curing agent B | curing agent B |
| Amount (part) | 7 | 20 | 25 | 25 |
| Coating Thickness (μm) | 15 | 10 | 5 | 5 |
| Leveling Agent (part) | 0.01 | 0.01 | 0.01 | 0.01 |
| Cured by | heat | heat | heat | heat |
| Curing Condition | | | | |
| Temperature (° C.) | 80 | 120 | 100 | 120 |
| Time (min) | 3 | 3 | 3 | 3 |
| Surface Protective Layer | | | | |
| Curable Resin | A | A | A | B |
| Coating Thickness (μm) | 5 | 5 | 5 | 5 |
| Cured by | heat | heat | heat | UV |
| Curing Condition | | | | |
| Temperature (° C.) | 120 | 120 | 120 | UV curing 2 |
| Time (hr) | 2 | 2 | 2 | |
| Weatherability (2000-hr test) | | | | |
| Interlayer Adhesion | B | A | A | A |
| Surface Hardness | A | A | A | A |
| Yellowing Degree | 2 | 2 | 1 | 1 |
| Weatherability (8000-hr test) | | | | |
| Interlayer Adhesion | B | B | A | A |
| Surface Hardness | A | A | A | A |
| Yellowing Degree | 4 | 2 | 1 | 3 |
| Hot Water Resistance (2-hr test) | A | A | A | A |
| Hot Water Resistance (4-hr test) | B | B | A | A |

| Resin Base | Example 5 poly-carbonate | Example 6 poly(methyl methacrylate) | Comp. Ex. 1 poly(methyl methacrylate) |
|---|---|---|---|
| Base Protective Layer | | | |
| Used Polymer | Polymer 4 | Polymer 7 | Polymer 6 |
| Additive Type UV Absorbent (part) | — | — | — |
| Curing Agent Type | curing agent B | — | — |
| Amount (part) | 25 | — | — |

TABLE 3-continued

|  |  |  |  |
|---|---|---|---|
| Coating Thickness (μm) | 5 | 15 | 3 |
| Leveling Agent (part) | 0.01 | 0.01 | 0.01 |
| Cured by | heat | UV | forced drying |
| Curing Condition |  |  |  |
| Temperature (° C.) | 60 | UV curing 1 | 80 |
| Time (min) | 3 |  | 3 |
| Surface Protective Layer |  |  |  |
| Curable Resin | E | B | B |
| Coating Thickness (μm) | 5 | 5 | 5 |
| Cured by | heat | UV | UV |
| Curing Condition |  |  |  |
| Temperature (° C.) | 120 | UV curing 2 | UV curing 2 |
| Time (hr) | 2 |  |  |
| Weatherability (2000-hr test) |  |  |  |
| Interlayer Adhesion | A | A | A |
| Surface Hardness | A | A | A |
| Yellowing Degree | 1 | 1 | 2 |
| Weatherability (8000-hr test) |  |  |  |
| Interlayer Adhesion | A | A | C |
| Surface Hardness | A | A | C |
| Yellowing Degree | 1 | 3 | 3 |
| Hot Water Resistance (2-hr test) | A | A | A |
| Hot Water Resistance (4-hr test) | A | B | *2 |

*1: The coating was whitened and cracked 2500 hours into the test and the test was then discontinued.
*2: Delamination from the surface protective layer occurred

TABLE 4

|  | Example 7 polycarbonate | Example 8 polycarbonate | Example 9 polycarbonate |
|---|---|---|---|
| Resin Base |  |  |  |
| Base Protective Layer |  |  |  |
| Used Polymer | Polymer 5 | Polymer 5 | Polymer 3 |
| Additive Type UV Absorbent (part) | — | — | — |
| Curing Agent Type | curing agent C | curing agent B | curing agent B |
| Amount (part) | 20 | 25 | 25 |
| Coating Thickness (μm) | 5 | 5 | 5 |
| Leveling Agent (part) | 0.01 | 0.01 | 0.01 |
| Cured by | heat | heat | heat |
| Curing Condition |  |  |  |
| Temperature (° C.) | 120 | 120 | 100 |
| Time (min) | 3 | 3 | 20 |
| Surface Protective Layer |  |  |  |
| Curable Resin | C | D | A |
| Coating Thickness (μm) | 5 | 5 | 5 |
| Cured by | UV | heat | heat |
| Curing Condition |  |  |  |
| Temperature (° C.) | UV curing 3 | heat curing 1 | 120 |
| Time (hr) |  |  | 2 |
| Weatherability (2000-hr test) |  |  |  |
| Interlayer Adhesion | A | A | B |
| Surface Hardness | A | A | A |

TABLE 4-continued

|  |  |  |  |
|---|---|---|---|
| Yellowing Degree | 1 | 2 | 1 |
| Weatherability (8000-hr test) |  |  |  |
| Interlayer Adhesion | A | A | C |
| Surface Hardness | A | B | B |
| Yellowing Degree | 3 | 3 | 1 |
| Hot Water Resistance (2-hr test) | A | A | B |
| Hot Water Resistance (4-hr test) | A | A | B |

|  | Example 10 polycarbonate | Comp. Ex. 2 polycarbonate | Comp. Ex. 3 polycarbonate |
|---|---|---|---|
| Resin Base |  |  |  |
| Base Protective Layer |  |  |  |
| Used Polymer | Polymer 10 | Polymer 8 | Polymer 9 |
| Additive Type UV Absorbent (part) | — | 15 | 20 |
| Curing Agent Type | curing agent C | — | curing agent B |
| Amount (part) | 20 | — | 25 |
| Coating Thickness (μm) | 5 | 10 | 5 |
| Leveling Agent (part) | 0.01 | 0.01 | 0.01 |
| Cured by | heat | forced drying | heat |
| Curing Condition |  |  |  |
| Temperature (° C.) | 120 | 80 | 100 |
| Time (min) | 3 | 3 | 3 |
| Surface Protective Layer |  |  |  |
| Curable Resin | A | A | B |
| Coating Thickness (μm) | 5 | 5 | 5 |
| Cured by | heat | heat | UV |
| Curing Condition |  |  |  |
| Temperature (° C.) | 120 | 120 | UV curing 2 |
| Time (hr) | 2 | 2 |  |
| Weatherability (2000-hr test) |  |  |  |
| Interlayer Adhesion | A | C | C |
| Surface Hardness | A | B | C |
| Yellowing Degree | 2 | 6 | 8 |
| Weatherability (8000-hr test) |  |  |  |
| Interlayer Adhesion | A | *1 | *1 |
| Surface Hardness | A | *1 | *1 |
| Yellowing Degree | 2 | *1 | *1 |
| Hot Water Resistance (2-hr test) | A | C | C |
| Hot Water Resistance (4-hr test) | A | *2 | *2 |

*1: The coating was whitened and cracked 2500 hours into the test and the test was then discontinued.
*2: Delamination from the surface protective layer occurred Additive type UV absorbent: "MARK LA 31" (a product of Adeka Argus Chemical Co., Ltd.)
Curing agent A: isocyanate ("SUMIDULE N-3200", a product of Sumitomo Bayer Urethane Co., Ltd.)
Curing agent B: block isocyanate ("DURANATE MF-K 60X", a product of Asahi Chemical Industry Co., Ltd., Japan)
Curing agent C: melamine ("CYMEL 212", a product of Mitsui Cyanamid Co., Ltd.)
Curable resin A: "TOSGARD 510" (a product of Toshiba Silicone Corporation)
Curable resin B: "UVHC 8553" (a product of Toshiba Silicone Corporation)
Curable resin C: a mixture of "NK OLIGO U4H" (a product of SHIN-NAKAMURA CHEMICAL CO., LTD., Japan)/

"ARONIX TO-1429" (a product of Toa Gosei Co., Ltd., Japan)=7/3 (by weight ratio)

Curable resin D: "UW C-3600" (a product of Nippon Shokubai Co., Ltd., Japan)

Curable resin E: "SOLGARD NP 730" (a product of Nippon Dacro Shamrock Co., Ltd.)

UV curing 1: To an ultraviolet absorptive polymer solution, 1 part of a radical photoinitiator ("DAROCURE-1173", a product of Ciba Geigy Ltd.) and the resulting mixture was adjusted to a predetermined viscosity to yield a coating composition of ultraviolet absorptive polymer. The surface of a resin base was cleaned with ethyl alcohol and was coated with the coating composition. The coated article was dried in hot air at 80° C. for 30 minutes and was placed on a conveyer moving at a rate of 5 m/min. Ultraviolet radiation was then irradiated twice to the article from a height of 20 cm with a high pressure mercury lamp (120 W/cm).

UV curing 2: A base protective layer was formed on a resin base, and "UVHC 8553" (a product of Toshiba Silicone Corporation, Japan) was adjusted to a predetermined viscosity and was applied onto a surface of the base protective layer. The coated article was allowed to stand at room temperature for 5 minutes and was placed on a conveyer moving at a rate of 5 m/min. Ultraviolet radiation was then irradiated twice to the article from a height of 20 cm with a high pressure mercury lamp (120 W/cm).

UV curing 3: To a solution of the curable resin C, 1 part of a radical photoinitiator ("DAROCURE-1173", a product of Ciba Geigy Ltd.) was added and the resulting mixture was adjusted to a predetermined viscosity to yield a solution of a coating composition of the curable resin C. The coating composition was applied onto a surface of the base protective layer. The coated article was dried in hot air at 80° C. for 30 minutes and was placed on a conveyer moving at a rate of. 5 m/min. Ultraviolet radiation was then irradiated twice to the article from a height of 20 cm with a high pressure mercury lamp (120 W/cm).

Heat curing 1: To 100 parts of a resin "UW C-3600" containing the combined inorganic particle, 17 parts of a curing agent A and 0.01 part of a leveling agent "BYK 300" were added and the resulting mixture was stirred and was adjusted to a predetermined viscosity. The resulting composition was applied onto a surface of the base protective layer and was heated and cured at 80° C. for 2 hours.

Tables 3 and 4 show that resin plates according to Examples from 1 to 8 and 10, in which a base protective layer containing an ultraviolet absorptive polymer was formed, had an interlayer adhesion of A or B rank, both after the 2000-hr test and after the 8000-hr test. The interlayer adhesion was an index of the weatherability. The resin plates also had a yellowing degree ranging from 1 to 3 after the 2000-hr test, indicating that they had a satisfactory weatherability. The resin plates of these examples had a satisfactory surface hardness of A or B rank and a high hot water resistance of A or B rank as well as an excellent interlayer adhesion.

Specifically, the base protective layers according to these examples were converted into cured coatings by heat or ultraviolet radiation, and the resulting resin plates showed a satisfactory weatherability with a yellowing degree after the 8000-hr test in a range of 1 to 4. In contrast, the resin plate according to Comparative Example 1 having a thermoplastic base protective layer had an interlayer adhesion and a surface hardness after the 8000-hr test of C rank and exhibited a poor hot water resistance with delamination from the surface protective layer. In Example 9, the base protective layer was cured for a longer curing time and was excessively cured, and the resulting resin plate showed a somewhat low interlayer adhesion, hot water resistance and surface hardness.

In Comparative Examples 2 and 3, an additive type ultraviolet absorbent was added to the base protective layer. The resin plate according to Comparative Example 3, in which the additive type ultraviolet absorbent was added in a relatively large amount, had a surface hardness after the 2000-hr test of C rank, and an interlayer adhesion and a hot water resistance of C rank. This resin plate could not be used in practice. Each of the resin plates according to the comparative examples had an inferior yellowing degree of 6 and 8, and 2500 hours into the test, the coating was cracked and whitened, and the evaluation could not be performed.

Example 11

To 100 parts of the ultraviolet absorptive copolymer having a reactive silyl group obtained in Synthesis Example 10, 0.04 part of a leveling agent ("BYK 331", a product of BigChemie) was added. The resulting mixture was adjusted to a predetermined viscosity with propylene glycol monomethyl ether to yield an acrylic resin solution. The surface of a polycarbonate resin plate 3 mm thick was cleaned with ethyl alcohol, and a film of the acrylic resin solution was applied to a coating thickness of 10 $\mu$m onto the surface of the polycarbonate resin plate. The applied film was allowed to stand at room temperature for 10 minutes and was then heated and cured at 60° C. for 10 minutes to form a base protective layer. Onto the base protective layer, a film of a silicone-based hardcoat composition A ("TOSGARD 510", a product of Toshiba Silicone Corporation, Japan) was applied to a coating thickness of 5 $\mu$m, and the applied film was allowed to stand at room temperature for 10 minutes and was heated and cured at 120° C. for 1 hour to yield a surface protective layer (a hardcoat layer). The properties of the prepared ultraviolet absorptive laminated resin plate were evaluated in the same manner as in Example 1.

Examples 12 to 16, Comparative Examples 4 and 5, and Reference Example

A series of ultraviolet absorptive laminated resin plates were prepared in the same manner as in Example 11, by forming a base protective layer containing a predetermined polymer onto a resin base shown in Table 5, and forming a surface protective layer (a hardcoat layer) composed of a predetermined curable resin onto the base protective layer. The properties of the laminated resin plates were evaluated in the same manner as in Example 11, and the results are shown in Table 5.

TABLE 5

| Resin Base | Ex. 11 PC | Ex. 12 PC | Ex. 13 PC | Ex. 14 PC | Ex. 15 PC |
|---|---|---|---|---|---|
| Base Protective Layer | | | | | |
| Copolymer 11 | 100 | 100 | | | |
| Copolymer 12 | | | 100 | | |
| Copolymer 13 | | | | 100 | |
| Copolymer 14 | | | | | 100 |
| Copolymer 15 | | | | | |
| Copolymer 16 | | | | | |
| Copolymer 17 | | | | | |

TABLE 5-continued

| | | | | | |
|---|---|---|---|---|---|
| Leveling Agent (BYK331) | 0.04 | 0.04 | 0.04 | 0.04 | 0.04 |
| Additive Type UVA | | | | | |
| Curing Catalyst A | | 0.4 | 0.4 | 0.4 | 0.4 |
| Coating Thickness (μm) | 10 | 10 | 2 | 4 | 4 |
| Curing Condition | | | | | |
| Curing Temperature (° C.) | 60 | 60 | 120 | 120 | 120 |
| Curing Time (min) | 10 | 10 | 10 | 10 | 10 |
| Hardcoat Layer | | | | | |
| Resin | silicone A | silicone A | silicone B | silicone B | silicone B |
| Coating Thickness (μm) | 5 | 5 | 5 | 5 | 5 |
| Curing Condition | | | | | |
| Curing Temperature (° C.) | 120 | 120 | 120 | 120 | 120 |
| Curing Time (min) | 120 | 60 | 60 | 60 | 60 |
| Performance Evaluation | | | | | |
| Hot Water Resistance (2-hr) | A | A | A | A | A |
| Hot Water Resistance (4-hr) | B | B | A | A | A |
| Weatherability (2000-hr test) | | | | | |
| Surface Hardness | A | A | A | A | A |
| Interlayer Adhesion | A | A | A | A | A |
| Yellowing Degree | 1 | 1 | 1 | 1 | 1 |
| Weatherability (8000-hr test) | | | | | |
| Surface Hardness | B | A | A | A | A |
| Interlayer Adhesion | B | B | B | A | A |
| Yellowing Degree | 3 | 3 | 1 | 1 | 1 |

| | Ex. 16 | Ref. Ex. | Comp. Ex.4 | Comp. Ex.5 |
|---|---|---|---|---|
| Resin Base | PC | PC | PC | PC |
| Base Protective Layer | | | | |
| Copolymer 11 | | 100 | | |
| Copolymer 12 | | | | |
| Copolymer 13 | | | | |
| Copolymer 14 | | | | |
| Copolymer 15 | | | | 100 |
| Copolymer 16 | | | 100 | |
| Copolymer 17 | 100 | | | |
| Leveling Agent (BYK331) | 0.04 | 0.04 | 0.04 | 0.04 |
| Additive Type UVA | | | | 8 |
| Curing Catalyst A | 0.4 | | | |
| Coating Thickness (μm) | 7 | 10 | 4 | 4 |
| Curing Condition | | | | |
| Curing Temperature (° C.) | 60 | 60 | 120 | 120 |
| Curing Time (min) | 10 | 10 | 10 | 10 |
| Hardcoat Layer | | | | |
| Resin | silicone A | organic C | silicone B | silicone B |
| Coating Thickness (μm) | 5 | 5 | 5 | 5 |
| Curing Condition | | | | |
| Curing Temperature (° C.) | 120 | UV curing *1 | 120 | 120 |
| Curing Time (min) | 60 | — | 60 | 60 |
| Performance Evaluation | | | | |
| Hot Water Resistance (2-hr) | A | A | A | C |
| Hot Water Resistance (4-hr) | A | B | *3 | *3 |
| Weatherability (2000-hr test) | | | | |
| Surface Hardness | A | A | A | C |
| Interlayer Adhesion | A | A | A | C |
| Yellowing Degree | 1 | 1 | 1 | 10 |
| Weatherability (8000-hr test) | | | | |
| Surface Hardness | A | B | C | *2 |
| Interlayer Adhesion | A | C | C | *2 |
| Yellowing Degree | 2 | 3 | 2 | *2 |

PC: polycarbonate

Additive type UV absorbent: "MARK LA31" (a product of ADEKA ARGUS CHEMICAL CO.)

Curing catalyst A: dibutyltin dilaurate

Silicone hardcoat composition A: TOSGARD 510 (a product of Toshiba Silicone Corporation, Japan)

Silicone hardcoat composition B: SOLGARD NP 730 (a product of Nippon Dacro Shamrock Co., Ltd.)

Organic hardcoat composition C: a mixture of NK OLIGO U4H (a product of SHIN-NAKAMURA CHEMICAL CO., LTD., Japan)/LITE ESTER 1.6HX-A (Kyoei Chemical Co., Ltd., Japan)=7/3 (by weight ratio)

*1) To an ultraviolet absorptive polymer solution, 1 part of a radical-initiator ("DAROCURE-1173", a product of Ciba Geigy Ltd.) and the resulting mixture was adjusted to a predetermined viscosity to yield a coating composition of the organic hardcoat composition C. A film of the coating composition was applied onto the base protective layer. The coated film was dried in hot air at 80° C. for 30 minutes and the resulting article was placed on a conveyer moving at a rate of 5 m/min. Ultraviolet radiation was then irradiated twice to the article from a height of 20 cm with a high pressure mercury lamp (120 W/cm).

*2) The coating was whitened and cracked 3500 hours into the test, and the test was then discontinued.

*3) Delamination from the surface protective layer occurred.

Table 5 shows that resin plates according to Examples 11 to 16, which comprised a curable base protective layer containing an ultraviolet absorptive polymer having a reactive silyl group, and a surface protective layer (a hardcoat layer) formed on the base protective layer, had an interlayer adhesion of A or B rank, both after the 2000-hr test and after the 8000-hr test. The interlayer adhesion was an index of the weatherability. The resin plates also had a yellowing degree ranging from 1 to 3, indicating that they had a satisfactory weatherability. The laminated resin plates according to Examples 11 to 16 had a satisfactory surface hardness of scale A after the 2000-hr test and a high hot water resistance of A or B rank.

In contrast, the resin plate according to Comparative Example 4, in which a thermoplastic copolymer constituted the base protective layer, showed a poor surface hardness and interlayer adhesion of C rank after the 8000-hr weathering test and invited delamination of the surface protective layer from the base protective layer in the 4-hr hot water resistance test. In Comparative Example 5, an additive type ultraviolet absorbent was added to the base protective layer, and-the resulting resin plate showed a deteriorated interlayer adhesion after the 8000-hr weathering test, and invited delamination of the surface protective layer from the base protective layer in the 4-hr hot water resistance test. In Reference Example, an organic hardcoat was formed as an outermost surface layer, and the resulting resin plate had a somewhat insufficient interlayer adhesion and yellowing degree 8000 hours into the test, although the resin plate had a satisfactory weatherability 2000 hours into the test.

INDUSTRIAL APPLICABILITY

The invented resin plates have an improved weatherability without inviting ultraviolet-induced coloring or deterioration in interlayer adhesion and surface hardness, and have a high surface harness and a satisfactory abrasion resistance. Consequently, the invented resin plates can provide ultraviolet absorptive laminated resinous articles that can be used as substituents for metals and glass and as surface protective articles for solar batteries and polymer batteries. Such substitutive applications include windows, skylight windows, and other delighting means for automobiles, trains, aircraft, ships, and other transportation and buildings, and noise barriers for expressways. The invented laminated resinous articles can be laminated onto optional another member such as a building material with woodgrain printing by using a pressure-sensitive adhesive or an adhesive.

What is claimed is:

1. An ultraviolet absorptive laminated resinous article comprising a resin base, a base protective layer formed on a surface of said resin base to be protected, and a surface protective layer formed on said base protective layer, said base protective layer being composed of a cross-linked cured product, wherein said base protective layer comprises a polymer obtained by polymerizing a monomer component containing 5 to 70% by weight of at least one selected from monomers each having the following formula (1) and having an ultraviolet absorptive group:

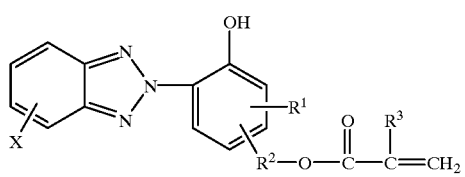

(1)

where $R^1$ is a hydrogen atom or a hydrocarbon group having 1 to 8 carbon atoms, $R^2$ is an alkylene group having 1 to 6 carbon atoms, $R^3$ is a hydrogen atom or a methyl group, and X is a hydrogen atom, a halogen, a hydrocarbon group having 1 to 8 carbon atoms, an alkoxy group having 1 to 6 carbon atoms, a cyano group or a nitro group, provided that either $R^1$ or X is a hydrogen atom;

said base protective layer further comprising a monomer represented by the formula

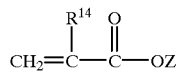

(8)

wherein $R^{14}$ is a hydrogen atom or a methyl group and Z is an alicyclic hydrocarbon group having 4 or more carbon atoms.

2. The ultraviolet absorptive laminated resinous article according to claim 1, wherein said base protective layer further comprises at least one monomer component having an ultraviolet stable group as another monomer component.

3. The ultraviolet absorptive laminated resinous article according to claim 2, wherein said monomer component having an ultraviolet stable group is at least one selected from monomers each having the following formula (3) or (4):

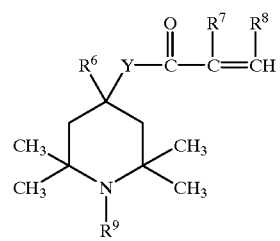

(3)

wherein $R^6$ is a hydrogen atom or a cyano group, $R^7$ and $R^8$ are each independently a hydrogen atom or a methyl group, $R^9$ is a hydrogen atom or a hydrocarbon group, and Y is an oxygen atom or an imino group;

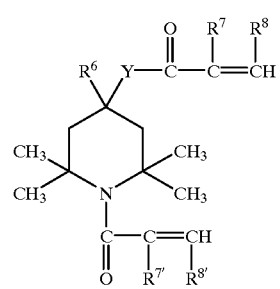

(4)

wherein $R^6$ is a hydrogen atom or a cyano group, $R^7$, $R^8$, $R^{7'}$, and $R^{8'}$ are each independently a hydrogen atom or a methyl group, and Y is an oxygen atom or an imino group.

4. The ultraviolet absorptive laminated resinous article according to claim 1, wherein said surface protective layer is a hardcoat layer.

5. The ultraviolet absorptive laminated resinous article according to claim 4, wherein said hardcoat layer is composed of at least one selected from silicone-based curable resins and curable resins containing organic polymer-combined inorganic fine particles.

6. The ultraviolet absorptive laminated resinous article according to claim 5, wherein said base protective layer further comprises at least one monomer component having a reactive silyl group as additional monomer component.

7. The ultraviolet absorptive laminated resinous article according to claim 6, wherein said reactive silyl group is a hydrolyzable silyl group.

8. The ultraviolet absorptive laminated resinous article according to claim 7, wherein said monomer component having a hydrolyzable silyl group is at least one selected from monomers each having any of the following formulae (5) to (7):

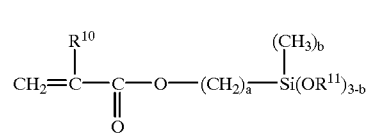

(5)

wherein $R^{10}$ is a hydrogen atom or a methyl group, $R^{11}$ is a hydrocarbon group having 1 to 6 carbon atoms, "a" is an integer of from 1 to 3, and b is 0 or 1;

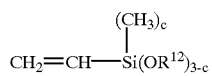 (6)
wherein $R^{12}$ has the same meaning as defined in $R^{11}$ or is an alkyloxyalkyl group, and c is 0 or 1;
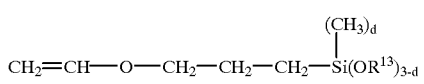 (7)
wherein $R^{13}$ has the same meaning as defined in $R^{11}$, and d is 0 or 1.
* * * * *